(12) United States Patent
Tanahashi et al.

(10) Patent No.: US 6,858,330 B2
(45) Date of Patent: Feb. 22, 2005

(54) PERPENDICULAR MAGNETIC RECORDING MEDIA AND MAGNETIC STORAGE APPARATUS USING THE SAME

(75) Inventors: Kiwamu Tanahashi, Kokubunji (JP); Atsushi Kikugawa, Higashimurayama (JP); Yukio Honda, Fuchu (JP)

(73) Assignee: Hitachi, Ltd., Tokyo (JP)

( * ) Notice: Subject to any disclaimer, the term of this patent is extended or adjusted under 35 U.S.C. 154(b) by 15 days.

(21) Appl. No.: 10/025,784

(22) Filed: Dec. 26, 2001

(65) Prior Publication Data

US 2002/0122958 A1 Sep. 5, 2002

(30) Foreign Application Priority Data

Dec. 28, 2000 (JP) ........................................ 2000-401913

(51) Int. Cl.[7] ............................. G11B 5/66; G11B 5/70
(52) U.S. Cl. ........................ 428/694 TS; 428/694 TM; 428/900
(58) Field of Search .................... 428/694 TM, 694 TS, 428/900

(56) References Cited

U.S. PATENT DOCUMENTS

| | | | | |
|---|---|---|---|---|
| 6,001,447 A | * | 12/1999 | Tanahashi et al. | 428/65.3 |
| 6,120,890 A | * | 9/2000 | Chen et al. | 428/332 |
| 6,562,489 B2 | * | 5/2003 | Abarra et al. | 428/694 TS |

FOREIGN PATENT DOCUMENTS

| | | |
|---|---|---|
| JP | 3-183-011 | 12/1989 |
| JP | 4-48707 | 6/1990 |
| JP | 07-129946 | 10/1993 |
| JP | 11-191217 | 12/1997 |
| JP | 2001-283419 | 3/2000 |
| JP | 2001283419 A | * 10/2001 |

OTHER PUBLICATIONS

Honda et al., "Effect of Soft Magnetic Underlayer on Magnetization Microstructure of Perpendicular Thin Film Media", Sep. 2000, IEEE Trans Magn, vol. 36, No. 5, pp. 2399–2401.*

Office Action dated Feb. 19, 2003 of the corresponding Japanese Patent Application 2000–401913 in which the above three references were cited (not translated).

* cited by examiner

*Primary Examiner*—Holly Rickman
(74) *Attorney, Agent, or Firm*—Reed Smith LLP; Stanley P. Fisher, Esq.; Juan Carlos A. Marquez, Esq.

(57) ABSTRACT

Disclosed are a double-layer perpendicular magnetic recording medium having a high medium S/N at a recording density of 50 Gbit or more per square inch and a magnetic storage apparatus with high reliability, which shows a low error rate. In the perpendicular magnetic recording medium in which a pre-coating layer, a soft magnetic underlayer, an intermediate layer, and a perpendicular recording layer are sequentially formed on a substrate, the soft magnetic underlayer contains Fe, Ta and C as main components, a Ta concentration is set to a range from 8 at % to 15 at %, and a ratio of a C concentration to the Ta concentration (C concentration/Ta concentration) is set to a range from 0.5 to 0.9.

13 Claims, 9 Drawing Sheets

EMBODIMENT 1-B (Fe-8at%Ta-16at%C)

COMPARISON 1-F (Fe-6at%Ta-12at%C)

PERPENDICULAR MAGNETIC RECORDING MEDIA AND MAGNETIC STORAGE APPARATUS USING THE SAME

BACKGROUND OF THE INVENTION

1. Field of the Invention

The present invention relates to a magnetic recording medium and a magnetic storage apparatus using the same, more particularly to a magnetic recording medium having a recording density of 50 Gbit or more per square inch and a magnetic storage apparatus incorporating the same thereinto.

2. Prior Art

In recent years, an amount of information which computers deal with has been increased steadily, and magnetic disc apparatuses as an external storage device have been required to demonstrate larger capacity storage and a higher-speed operation. However, as a recording density of the magnetic disc apparatus becomes higher, influences of so-called thermal fluctuation thereon are remarkable. It is considered that it is difficult for conventional longitudinal recording systems to achieve an areal recording density exceeding 40 Gbit per square inch.

On the other hand, perpendicular recording systems have a characteristic that a demagnetizing field at a bit transition is low unlike the longitudinal recording systems and magnetization is kept more stably as the recording density becomes higher. Accordingly, the perpendicular recording systems are considered to be one of effective means exceeding the thermal fluctuation limit of the conventional longitudinal recording systems.

As media used in the perpendicular recording systems, there are a double-layer perpendicular recording medium having a soft magnetic underlayer and a single-layer perpendicular recording medium having no soft magnetic underlayer. For the reasons that the double-layer perpendicular recording medium can use a single magnetic pole type head capable of acquiring strong perpendicular recording magnetic field and a sharp magnetic field gradient, and that the double-layer perpendicular recording medium shows an advantage that a higher resolution can be obtained compared to the single-layer perpendicular medium, a combination of the double-layer perpendicular recording medium and the single pole type head is considered to be effective from the viewpoint of practical use.

In the case of the double-layer perpendicular recording medium, though the high resolution can be obtained, noises originated in the soft magnetic underlayer are a problem in addition to noises originated in a recording layer, which are observed in the single-layer perpendicular recording medium. These noises are roughly classified into a spike noise caused from a magnetic domain wall of the soft magnetic underlayer and so-called a transition noise which occurs by fluctuation of a magnetization transition in the recording layer owing to a magnetization state of the soft magnetic underlayer.

With regard to a method for reducing the spike noise, as disclosed in, for example, Japanese Patent Laid-Open No. 7(1995)-129946 and 11(1999)-191217, there has been a method in which a hard magnetic pinning layer between a soft magnetic underlayer and a substrate is provided to control a magnetic domain structure of the soft magnetic underlayer and thus the spike noise is reduced. However, since this conventional method does not reduce both of the spike noise and the transition noise simultaneously, the conventional perpendicular magnetic recording medium does not sufficiently reduce the medium noises from the soft magnetic underlayer.

When the adoption of the perpendicular recording systems by using the combination of the double-layer perpendicular recording medium and the single pole type head is intended so as to achieve the recording density exceeding the thermal fluctuation limit of the longitudinal recording systems, it is necessary to significantly reduce the medium noises from the soft magnetic underlayer in addition to the medium noises from the recording layer.

SUMMARY OF THE INVENTION

The present invention was made to solve the foregoing problems. More specifically, an object of the present invention is to provide a perpendicular magnetic recording medium having a high medium S/N at a recording density of 50 Gbit or more per square inch, which reduces medium noises, and to facilitate realization of a high density magnetic recording apparatus.

As materials of the soft magnetic underlayer, a polycrystalline material such as NiFe and FeAlSi and an amorphous material such as CoNbZr and CoTaZr have heretofore been proposed. The inventors of this application used a material as the soft magnetic underlayer, which is substantially amorphous in a film formation and shows low saturation magnetic flux, and precipitates ferromagnetic α-Fe nanocrystals by annealing and gets a high saturation magnetic flux density. Thus, the inventors found that the spike noise observed in the conventional soft magnetic underlayer material can be reduced and further the transition noises originated in the soft magnetic underlayer can also be reduced.

It is important to precipitate the foregoing α-Fe nanocrystals uniformly in order to reduce the medium noises from the soft magnetic underlayer and to obtain good soft magnetic properties. To achieve this purpose, an alloy containing Fe, Ta and C as main components should be preferably used as a material for the soft magnetic underlayer, and a Ta concentration should be preferably set to a range from 8 at % to 15 at %. If the Ta concentration is set to be less than 8 at %, such a concentration is not desirable because the material is crystallized during the film formation and the medium noises significantly increase. On the contrary, if the Ta concentration is set to be more than 15 at %, such a concentration is not desirable because the saturation magnetic flux density decreases and a function to assist the head is damaged, so that writing of information to a medium having high coercivity is insufficient.

Furthermore, a ratio of the Ta concentration to the C concentration (Ta concentration/C concentration) should be set to a range from 0.5 to 0.9. It is possible to precipitate the ferromagnetic α-Fe nanocrystals uniformly by preferably annealing the material of the soft magnetic underlayer after setting the Ta concentration and the ratio of the Ta concentration to the C concentration (Ta concentration/C concentration) to the above described ranges. If the ratio of the Ta concentration to the C concentration is out of the above described range, separations of α-Fe and TaC by annealing are insufficient, and the soft magnetic properties are undesirably deteriorated.

The soft magnetic underlayer containing Fe, Ta and C as the main components may be formed directly on the substrate. However, nonuniformity of the soft magnetic properties depending on a kind of the substrate material and temperature distribution in annealing can be suppressed by forming the soft magnetic underlayer by annealing in a state where a pre-coating layer is inserted between the soft magnetic underlayer and the substrate. A material which shows good adhesion with the substrate, has a flat surface and reacts a little with the soft magnetic underlayer by annealing should be used as the pre-coating layer. To be concrete, amorphous or nanocrystal materials such as NiZr alloy, NiTa alloy, NiNb alloy, NiTaZr alloy, NiNbZr alloy, CoCrZr alloy and NiCrZr alloy can be used. Herein, the amorphous and nanocrystal materials indicate one in which no clear diffraction peaks can be observed by θ–2θ scan (mode) of the powder X-ray diffraction and 2θ scan (mode) of the thin film X-ray diffraction.

As an intermediate layer used in the perpendicular magnetic recording medium of the present invention, a nonmagnetic amorphous alloy layer or an alloy layer having an bcp structure can be used. As the perpendicular recording layer, a CoCrPt alloy film, a Co/Pd multilayer film, a Co/Pt multilayer film or the like can be used. Since particularly the Co/Pd multilayer film and the Co/Pt multilayer film can produce high coercivity equal to 5 kOe or more with a thin thickness, it is possible to increase the recording density by using a combination of them with the soft magnetic underlayer of the present invention.

As a protective layer of the perpendicular recording layer, a film having a thickness ranging from 3 to 10 nm, which contains carbon as a main component, is formed, and further a lubricant layer made of perfluoroalkylpolyether or the like is formed at a thickness ranging from 1 to 10 nm, whereby the perpendicular magnetic recording medium having high reliability can be obtained.

The magnetic storage apparatus of the present invention comprises: the foregoing perpendicular magnetic recording medium; a driving section for driving the perpendicular magnetic recording medium in a recording direction; a magnetic head composed of a recording section and a reproduction section; a unit for allowing the magnetic head to relatively move with respect to the perpendicular magnetic recording medium; and a recording/reproduction processing unit for performing a signal input to the magnetic head and for reproducing a output signal from the magnetic head, wherein a reproduction section of the magnetic head is constituted by a high sensitivity device utilizing a giant magnetoresistive effect or a tunneling magnetoresistive effect. With the above described constitution, the magnetic storage apparatus having high reliability at a recording density of 50 Gbit or more per square inch can be realized.

According to the present invention, it is possible to realize the magnetic storage apparatus having high reliability, which shows a low error rate at the recording density of 50 Gbit or more per square inch.

DETAILED DESCRIPTION OF THE PREFERRED EMBODIMENTS

Hereinafter, embodiments of the present invention will be described with reference to the accompanying drawings.

Embodiment 1

Figure 1:
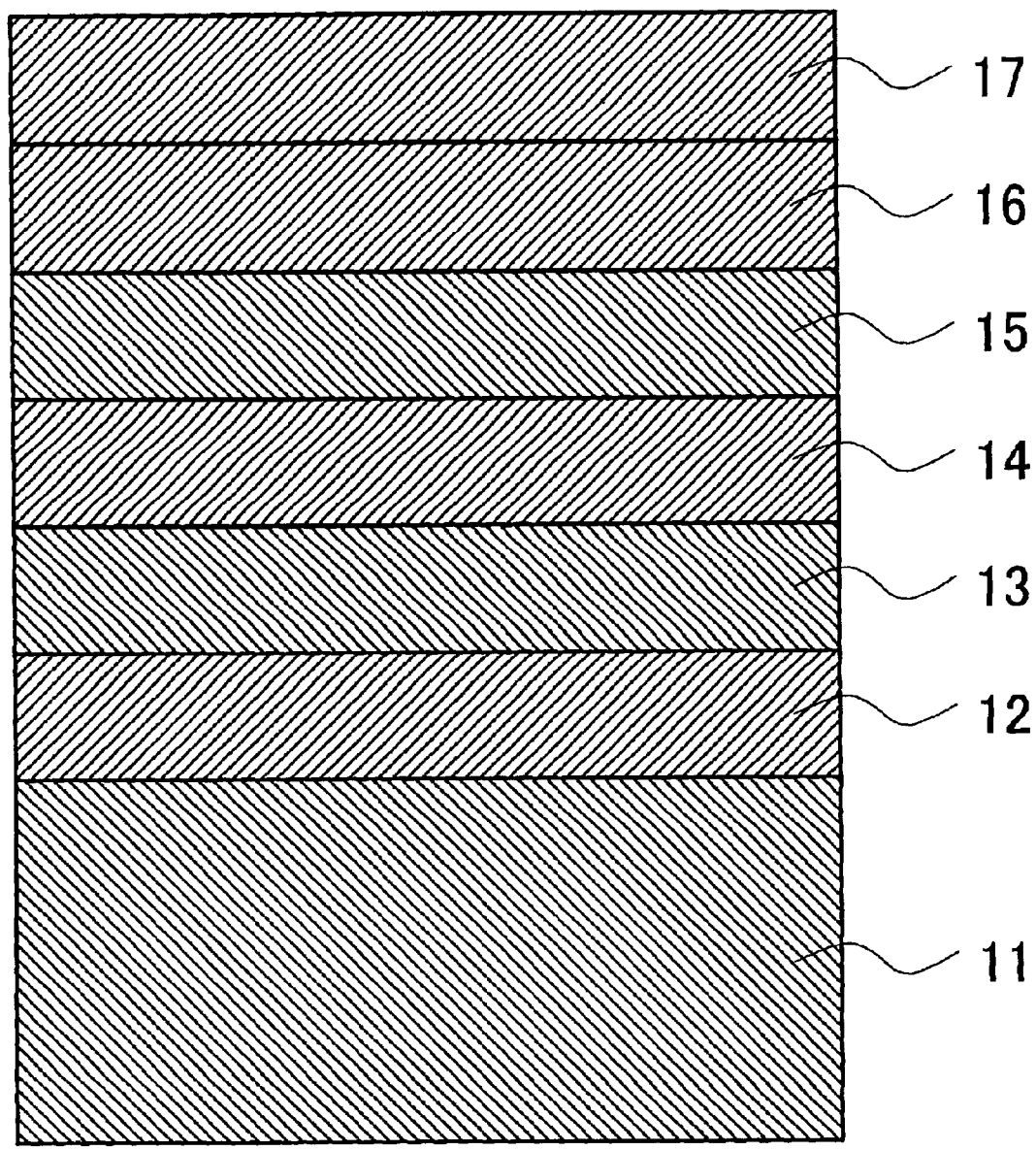
FIG. 1 is a drawing showing a layered structure of a perpendicular magnetic recording medium according to an embodiment of the present invention.

A layered structure of a perpendicular magnetic recording medium of this embodiment is shown in FIG. 1. A 2.5-inch-type glass substrate which has undergone an alkali cleaning was used for the substrate 11. On the substrate 11, sequentially deposited were the pre-coating layer 12, the soft magnetic underlayer 13, the intermediate layer 14, the perpendicular recording layer 15 and the protective layer 16 by using a DC magnetron sputtering method. Only the soft magnetic underlayer 13 was formed by changing its composition, and other layers are formed of the same composition. Seven kinds of samples A to G (F and G: comparison example) were prepared. Targets used for the preparations of the layers are shown in Table 1.

TABLE 1

|  |  | Pre-coating layer | Soft magnetic underlayer | Intermediate layer | Perpendicular recording layer | Protection layer |
|---|---|---|---|---|---|---|
| Embodiment 1 | A | Ni-37.5at%Ta-10at%Zr | Fe-8at%Ta-12at%C | Ni-37.5at%Ta-10at%Zr | Co-22at%Cr-14at%Pt | Carbon |
|  | B |  | Fe-8at%Ta-16at%C |  |  |  |
|  | C |  | Fe-10at%Ta-12at%C |  |  |  |
|  | D |  | Fe-10at%Ta-16at%C |  |  |  |
|  | E |  | Fe-12at%Ta-16at%C |  |  |  |
| Comparison 1 | F | Ni-37.5at%Ta-10at%Zr | Fe-6at%Ta-12at%C | Ni-37.5at%Ta-10at%Zr | Co-22at%Cr-14at%Pt | Carbon |
|  | G |  | Fe-8at%Ta-8at%C |  |  |  |

The soft magnetic underlayer 13 was formed under the process conditions in film preparation that Ar gas pressure was 0.5 Pa. Thereafter, annealing (a maximum temperature of the substrate at a range from 450 to 500° C.) was conducted by using an infrared lamp heater having power of 1600 W for 12 seconds. The substrate temperature during the formation of the perpendicular recording layer 15 was about 270° C. With respect to thicknesses of the layers, the pre-coating layer 12 is 30 nm; the soft magnetic underlayer 13, 474 nm; the intermediate layer 14, 5 nm; the perpendicular recording layer 15, 20 nm; and the protective layer 16, 5 nm. The lubricant layer 17 was formed in such a manner that a perfluoroalkylpolyether series material was diluted by a flurorocarbon material, and coated on the protective layer 16. To evaluate magnetic properties and microstructure of the soft magnetic underlayer 13, a sample in which the intermediate layer 14 and the perpendicular recording layer 15 were not formed was prepared under the same process conditions in film preparation.

Figure 2:
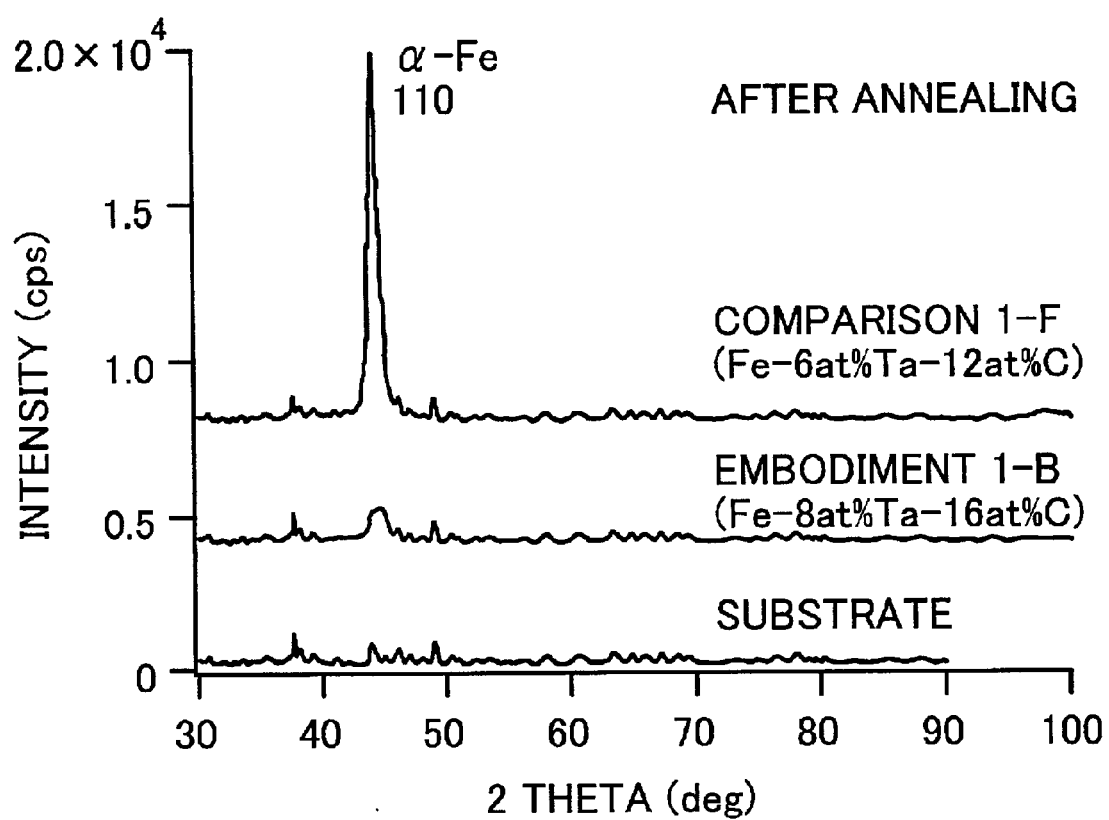
FIG. 2 is a graph showing an X-ray diffraction pattern for a soft magnetic underlayer after annealing.
Figure 3:
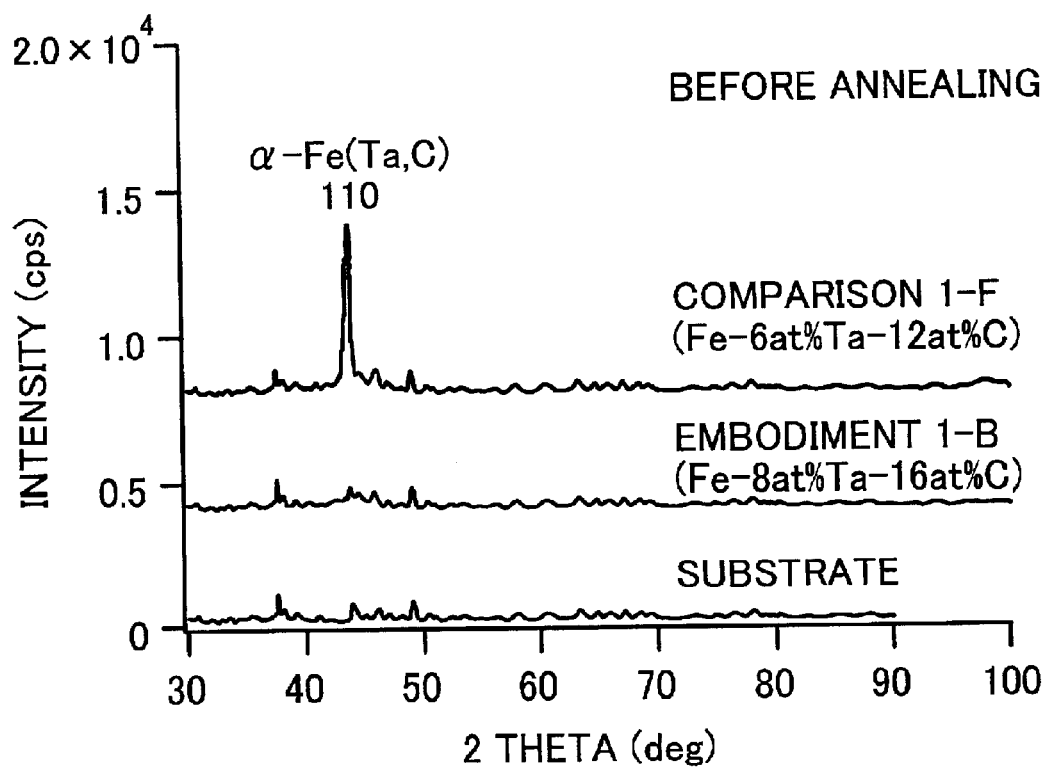
FIG. 3 is a graph showing an X-ray diffraction pattern for the soft magnetic underlayer before annealing.
Figure 4A:
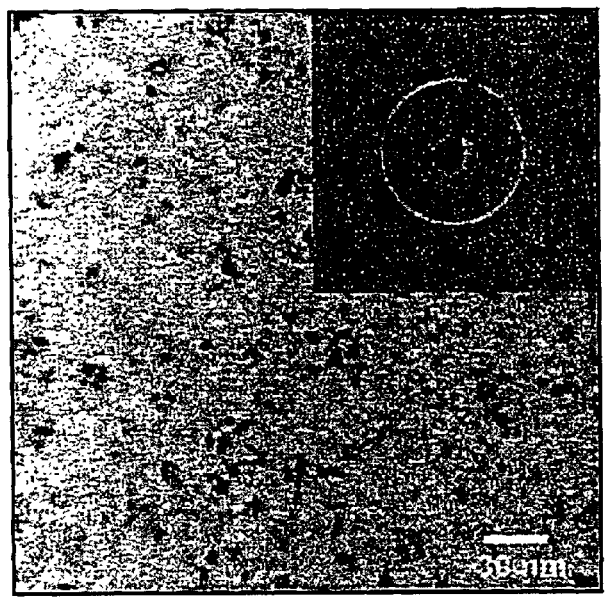
FIGS. 4A and 4B are drawings showing a plan-view TEM image and an electron diffraction pattern for the soft magnetic underlayer after annealing, respectively.
Figure 4B:
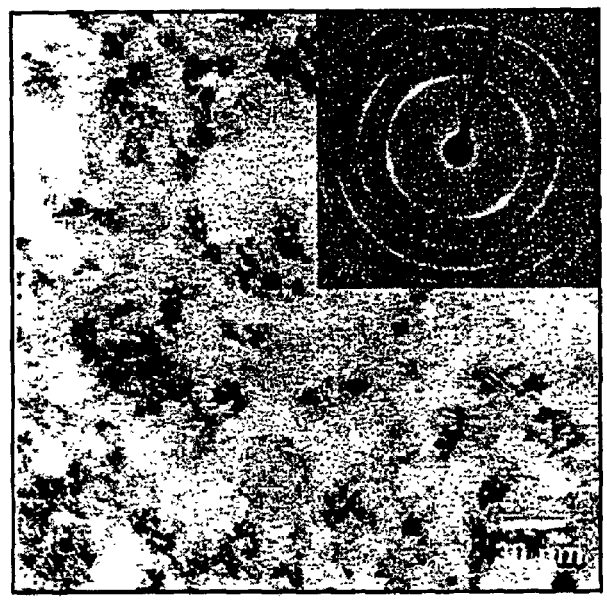

The noise characteristics of the media in this embodiment and the comparison example were evaluated by using a recording/reproduction separation type magnetic head. A gap length of a ring head for recording was set to 0.3 μm; a recording track width thereof, 1.7 μm; a shield gap of a GMR head for reproduction, 0.16 μm; a reproduction track width, 1.3 μm; and a flying height, 20 nm. Herein, as an index of the medium noise, a value was used, which was obtained by normalizing the medium noise (Nd) of 200 kFCI with a reproduction output (Slf) of 20 kFCI. The results are listed in Table 2.

diffraction peak was observed in the Fe-6at % Ta-12at % C film used for the medium G of the comparison example, and a weak α-Fe 110 diffraction peak was observed in the soft magnetic underlayer having other compositions. In FIG. 2, the X-ray diffraction pattern of the Fe-8at % Ta-16at % C film is shown as an example. This is because the Fe-6at % Ta-12at % C film is crystallized during a film formation (before annealing), while the as-deposited films having the other compositions are substantially amorphous as shown in FIG. 3. As a result, as shown in the TEM bright field image and the electron diffraction pattern of FIG. 4, the Fe-6at % Ta-12at % C film after annealing was composed of particles having a particle diameter of about 100 nm, each of which was formed by coalescing some crystal grains having diameters of 20 to 30 nm and substantially the same crystal orientation, while the films having other compositions were composed of nanocrystal grains of particle diameters of about 10 nm. In FIGS. 4A and 4B, the observation results for the Fe-8at % Ta-16at % C film are shown as an example. Accordingly, when the Fe—Ta—C alloy film is used as the soft magnetic underlayer, it is important that the Fe—Ta—C alloy film is amorphous during the film formation, and to achieve this purpose, it is proved that it is effective to set the Ta concentration to 8 at % or more. However, when the C concentration is low in spite of setting the Ta concentration to 8 at %, the medium G of the comparison example shows high medium noise. Accordingly, the ratio of the Ta concentration to the C concentration (Ta concentration/C concentration) must be set to a range from 0.5 to 0.9 in addition to setting the Ta concentration to 8 at % or more.

TABLE 2

| | | Soft magnetic underlayer | Ta concentration (at %) | C concentration (at %) | Ta concentration/ C concentration | Medium noise (μVrms/μVpp) | Perpendicular coercivity (kOe) | Square type ratio |
|---|---|---|---|---|---|---|---|---|
| Embodiment 1 | A | Fe-8at%Ta-12at%C | 8 | 12 | 0.67 | 0.0163 | 2.82 | 0.96 |
| | B | Fe-8at%Ta-16at%C | 8 | 16 | 0.50 | 0.0155 | 2.75 | 0.96 |
| | C | Fe-10at%Ta-12at%C | 10 | 12 | 0.83 | 0.0141 | 2.71 | 0.96 |
| | D | Fe-10at%Ta-16at%C | 10 | 16 | 0.63 | 0.0150 | 2.78 | 0.96 |
| | E | Fe-12at%Ta-16at%C | 12 | 16 | 0.75 | 0.0132 | 2.80 | 0.96 |
| Comparison 1 | F | Fe-6at%Ta-12at%C | 6 | 12 | 0.50 | 0.0423 | 2.38 | 0.92 |
| | G | Fe-8at%Ta-8at%C | 8 | 8 | 1.00 | 0.0518 | 2.59 | 0.93 |

Figure 9:
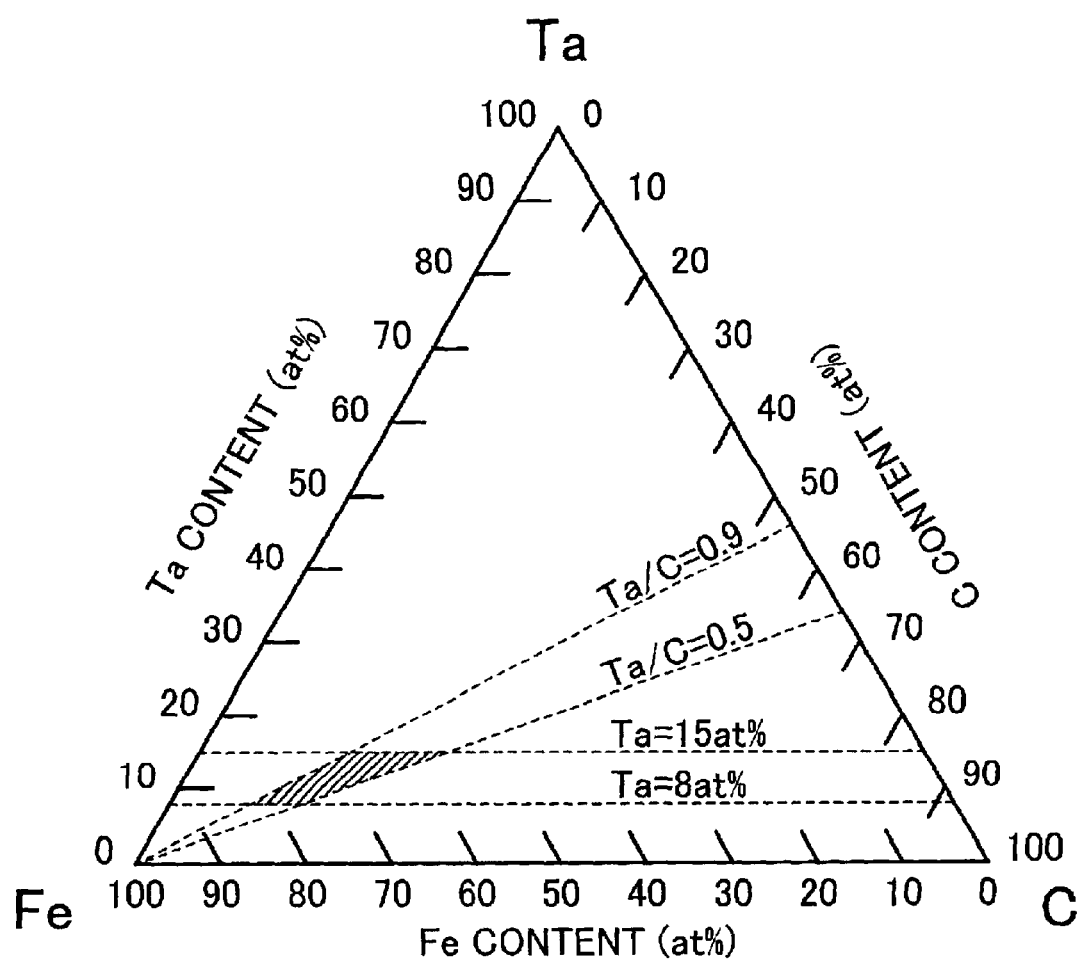
FIG. 9 is a diagram showing a composition region of FeTaC alloy in which a low noise characteristic can be obtained.

The medium noise largely depends on the composition of the soft magnetic underlayer. When the Ta concentration was 8 at % or more and the ratio of the Ta concentration to the C concentration was at a range from 0.5 to 0.9 (see FIG. 9), a low noise characteristic was obtained. As also shown in Table 2, since no remarkable differences in perpendicular coercivity and squareness were observed among the media of this embodiment and the comparison examples large differences in the medium noise among the media of the embodiment and the comparison examples are considered to be caused by the soft magnetic underlayer. Then, microstructures of the soft magnetic underlayers in the media were examined by X-ray diffraction and a transmission electron microscope (TEM).

X-ray diffraction patterns of the soft magnetic underlayers after annealing are shown in FIG. 2. A very large α-Fe 110

Next, the magnetic properties of the soft magnetic underlayers were examined by using a vibration sample magnetometer. The results are shown in Table 3. Herein, a magnetic field was applied along a head running direction, and as the value of a saturation magnetic flux density Bs, a magnetization value at an applied magnetic field of 13 kOe at a temperature of 298 K was used. Each of the soft magnetic underlayers of the embodiment showed an excellent soft magnetic properties in which the saturation magnetic flux density Bs was equal to about 1.5 T or more and coercivity Hc (298 K) measured at a temperature of 298 K was equal to 1 Oe or less. Note that the magnetic properties were measured by use of samples in which the pre-coating layer and the soft magnetic underlayer were formed on the substrate and the resultant structure was annealed.

TABLE 3

|  | | Soft magnetic underlayer | Bs (T) | Hc(298K) (Oe) | Hc(173K) (Oe) | Hc(298K)/ Hc(173K) | Medium noise ($\mu$Vrms/ $\mu$Vpp) |
|---|---|---|---|---|---|---|---|
| Embodiment 1 | A | Fe-8at%Ta-12at%C | 1.65 | 0.6 | 3.1 | 0.19 | 0.0163 |
|  | B | Fe-8at%Ta-16at%C | 1.49 | 0.3 | 3.2 | 0.09 | 0.0155 |
|  | C | Fe-10at%Ta-12at%C | 1.51 | 1.0 | 7.8 | 0.13 | 0.0141 |
| Comparison 1 | F | Fe-6at%Ta-12at%C | 1.72 | 8.7 | 11.3 | 0.77 | 0.0423 |
|  | G | Fe-8at%Ta-8at%C | 1.30 | 1.6 | 3.1 | 0.52 | 0.0518 |

Figure 5A:
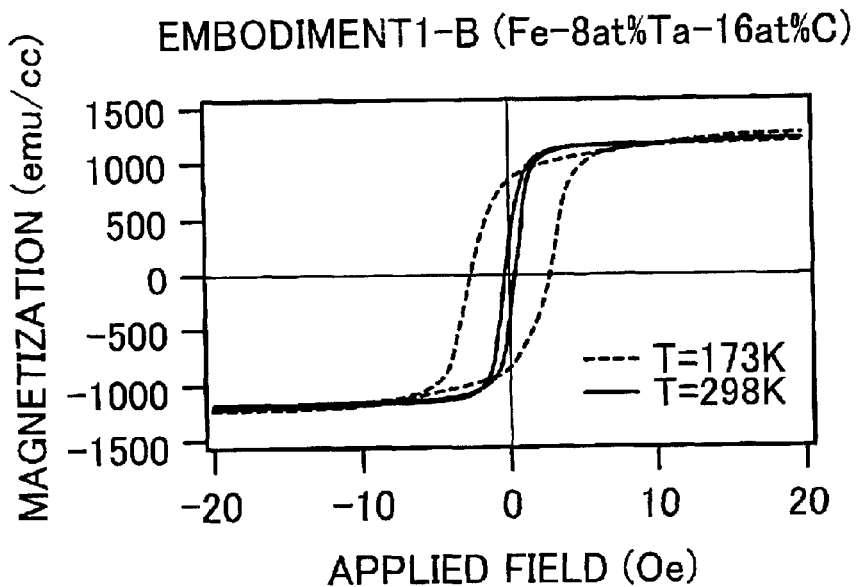
FIGS. 5A and 5B are graphs showing magnetization curves of the soft magnetic underlayer, which are measured at temperatures of 297 K and 173K, respectively.
Figure 5B:
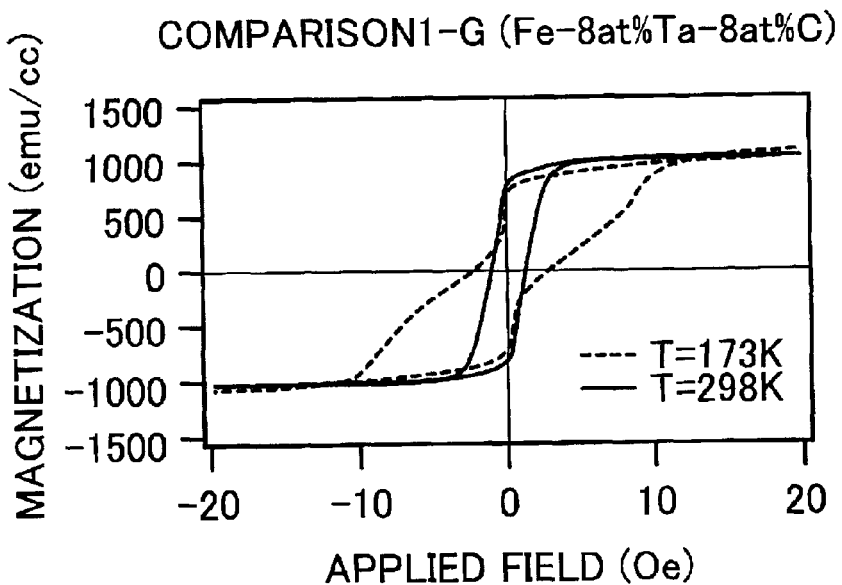

The magnetization curves for the soft magnetic underlayers measured at temperatures of 298 K and 173 K are shown in FIGS. 5A and 5B. As shown in FIG. 5A, in the case of the soft magnetic underlayers of the embodiment, coercivity Hc (173K) measured at the temperature of 173 K increases compared to coercivity Hc (298 K) measured at the temperature of 298 K. Since influences of the thermal fluctuations becomes more remarkable as the diameters of the crystal grains are smaller, it is considered that such a low coercivity is obtained owing to the grain diameter of the α-Fe nanocrystal which is as small as about 10 nm in the soft magnetic layer of the embodiment. On the other hand, the Fe-6at % Ta-12at % C film of the comparison example 1 showed the coercivity Hc (298K) as large as 8.7 Oe. This is probably because the size of the α-Fe crystal grain becomes larger and a contribution of crystalline magnetic anisotropy increases. Furthermore, in the Fe-8at % Ta-8at % C film of the comparison example 1, as shown in FIG. 5B, the magnetization curve measured at the temperature of 173 K has a shape like a combination of magnetization curves having different properties, and Bs is as low as 1.3 T. Accordingly, it is considered that separations of α-Fe and TaC by annealing are insufficient.

As described above, to suppress the medium noise from the soft magnetic underlayer to be low, it is important to uniformly precipitate the α-Fe nanocrystals having a grain diameter of about 10 nm. The soft magnetic underlayer having such a microstructure has properties that coercivity Hc (298K) at a normal temperature is as low as 1 Oe or less and increases at a low temperature. In the embodiment, any of the coercivity Hc (173K) at a low temperature shows a value of 3 Oe or more. Accordingly, it is considered that the coercivity of the soft magnetic underlayer needed to be 1 Oe or less at a normal temperature (298K) and about 3 Oe or more at a low temperature (173K). Note that, though the Fe—Ta—C alloy film was described as the example of the material for the soft magnetic underlayer in the embodiment, the material is not especially limited as long as the coercivity Hc (298K) is 1 Oe or less and the coercivity Hc (173K) is 3 Oe or more.

Figure 6:
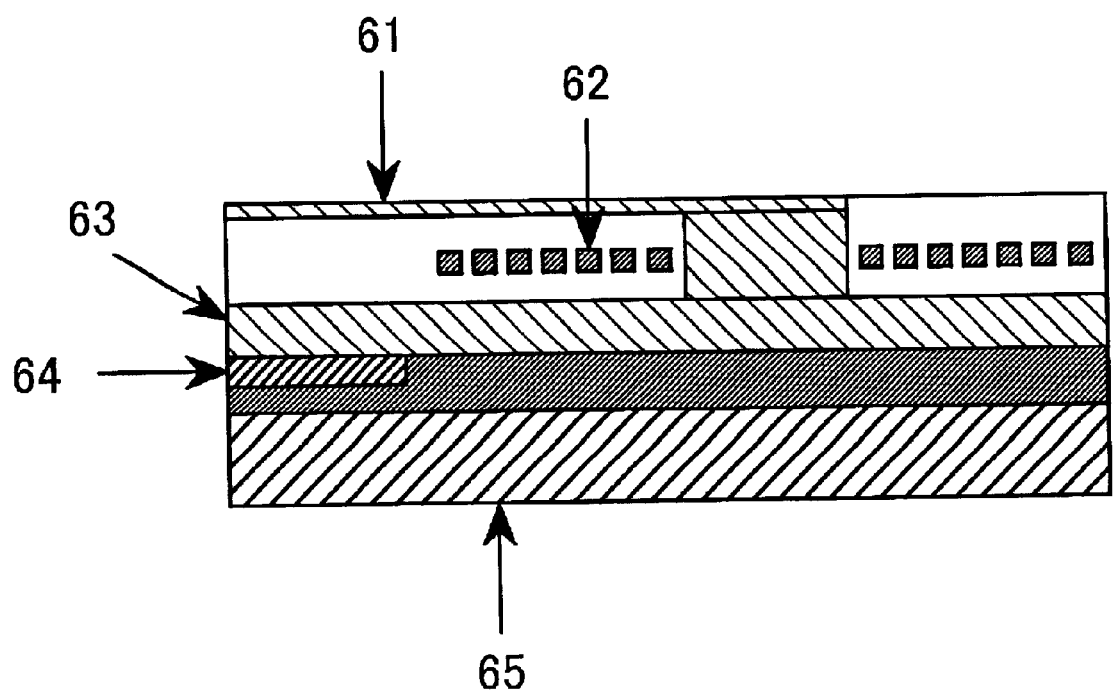
FIG. 6 is a schematic cross-sectional view of a recording/reproduction separation type head.

The recording/reproduction was performed under the condition that a head flying height is 10 nm, by use of the medium B of the embodiment, a single pole type head having a track width of 0.25 μm for recording, and a GMR head having a shield gap of 0.08 μm and a track width of 0.22 μm for reproduction. When an error rate evaluation for a reproduction waveform of a signal was carried out through an EEPR4 series signal processing circuit, an error rate value of $10^{-6}$ or less was obtained under the condition that areal recording density was 50 Gb/in². A recording/reproduction separation type head used for this evaluation has a constitution composed of the main magnetic pole 61, the recording coil 62, the auxiliary magnetic pole/upper shield 63, the GMR element 64 and the lower shield 65 as shown in FIG. 6.

Embodiment 2

Figure 7A:
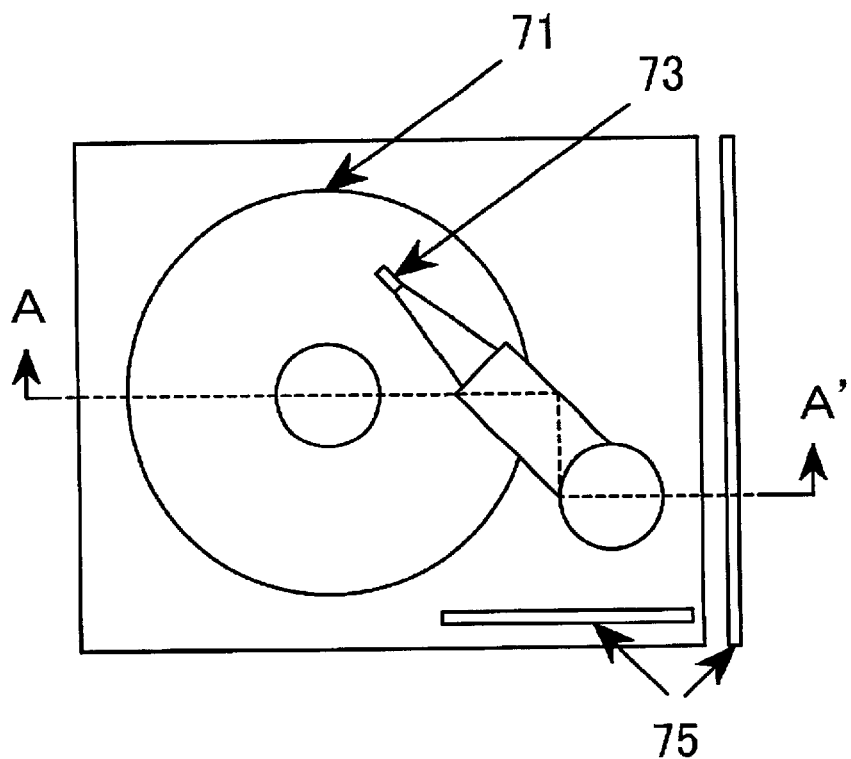
FIG. 7A is a schematic plan view of a magnetic storage apparatus according to the present invention and FIG. 7B is a cross-sectional view thereof taken along the line A–A' of FIG. 7A.
Figure 7B:
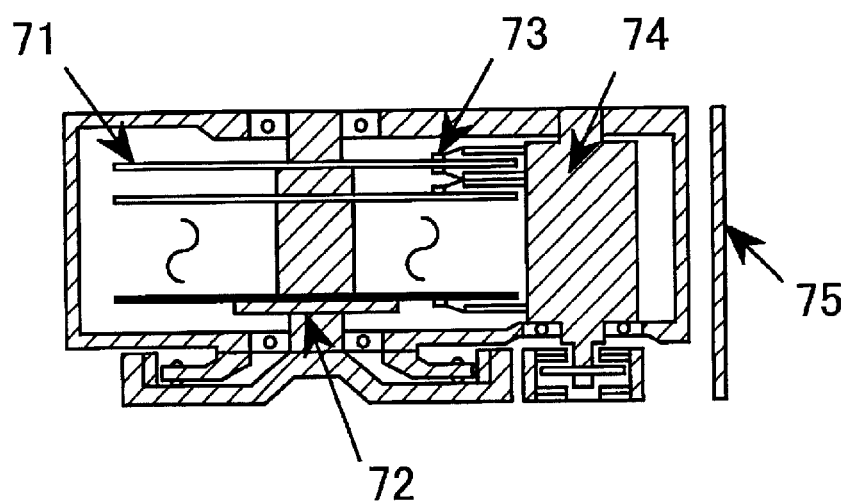

The magnetic storage apparatus of the present invention will be described by use of FIGS. 7A and 7B. The magnetic storage apparatus is the one having a well known constitution in which the perpendicular magnetic recording medium 71, the driving section 72 for rotating and driving the perpendicular magnetic recording medium 71, the magnetic head 73, the driving unit 74 for driving the magnetic head 73, and the recording/reproduction signal processing unit 75 of the magnetic head 73. The magnetic head 73 is a recording/reproduction separation type magnetic head formed on a magnetic head slider. The track width of the single pole type recording head is 0.25 μm, the shield gap of the GMR head for reproduction is 0.08 μm, and the track width is 0.22 μm.

The medium B of the embodiment 1 was incorporated in the foregoing magnetic storage apparatus, and the recording/reproduction characteristic was evaluated under the conditions that the head flying height was 10 nm, the linear recording density was 590 kBPI, and the track density was 89 kTPI. The magnetic storage apparatus fully satisfied a recording/reproduction characteristic specification of an areal recording density of 52.5 Gb/in² in a temperature range from 10 to 50° C.

Embodiment 3

Figure 8:
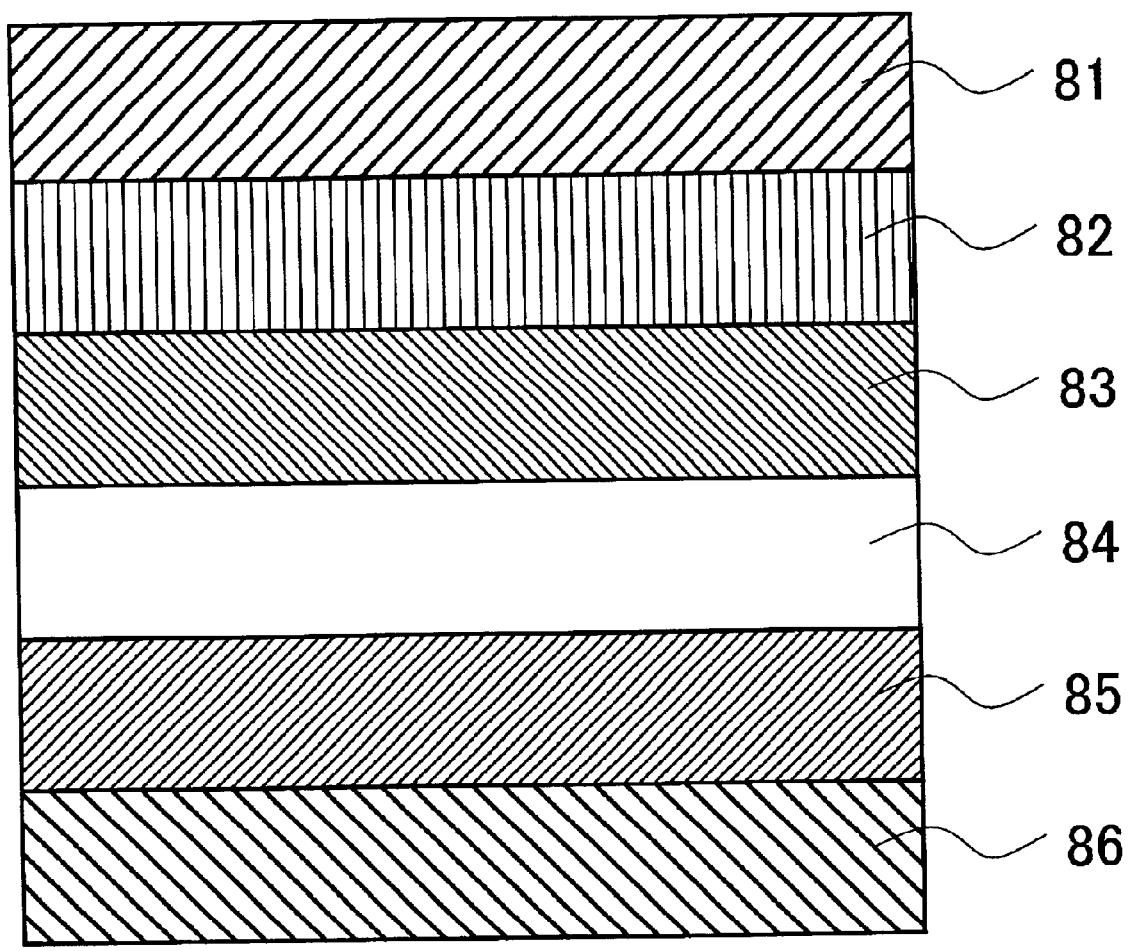
FIG. 8 is a drawing showing a layered structure of a high sensitivity device utilizing a tunneling magnetoresistive effect.

The medium E of the embodiment 1 was incorporated in a magnetic storage apparatus using a high sensitivity element utilizing a tunneling magnetoresistive effect for the reproduction head, which has the same constitution as the magnetic storage apparatus of the embodiment 2. The recording/reproduction characteristic was evaluated under the conditions that the head flying height was 10 nm, the linear recording density was 674 kBPI, and the track density was 89 kTPI. The magnetic storage apparatus fully satisfied a recording/reproduction characteristic specification of an areal recording density of 60 Gb/in² in a temperature range from 10 to 50° C. Note that the high sensitivity element utilizing the tunneling magnetoresistive effect, which was used for this evaluation, has a well known constitution composed of the upper electrode 81, the antiferromagnetic layer 82, the pinned layer 83, the insulating layer 84, the free layer 85 and the lower electrode 86 as shown in FIG. 8.

What is claimed is:

1. A perpendicular magnetic recording medium, comprising:
   a substrate;
   a soft magnetic underlayer formed on said substrate and containing ferromagnetic α-Fe nanocrystals;
   a nonmagnetic intermediate layer formed on said soft magnetic underlayer; and
   a perpendicular recording layer formed on said intermediate layer, wherein said soft magnetic underlayer contains Fe, Ta and C, and a concentration of said Ta ranges from 8 at % to 15 at %, and a nonmagnetic amorphous or nanocrystalline pre-coating layer is provided between said substrate and said soft magnetic underlayer, said pre-coating layer comprising at least one selected from the group consisting of NiZr alloy, NiTa alloy, NiNb alloy, NiTaZr alloy, NiNbZr alloy, CoCrZr alloy, NiCrZr alloy.

2. The perpendicular magnetic recording medium according to claim 1, wherein a ratio of the concentration of Ta to a concentration of C (Ta concentration/C concentration) ranges from 0.5 to 0.9.

3. The perpendicular magnetic recording medium according to claim 1, wherein in-plane coercivity Hc (298K) of said soft magnetic underlayer is 1 Oe or less and in-plane coercivity Hc (173K) of said soft magnetic underlayer is 3 Oe or more, the in-plane coercivity Hc (298K) being measured while applying magnetic field along a head running direction at a temperature of 298 K, and the in-plane coercivity Hc (173K) being measured while applying magnetic field along the head running direction at a temperature of 173 K.

4. The perpendicular magnetic recording medium according to claim 2, wherein in-plane coercivity Hc (298K) of said soft magnetic underlayer is 1 Oe or less and in-plane coercivity Hc (173K) of said soft magnetic underlayer is 3 Oe or more, the in-plane coercivity Hc (298K) being measured while applying magnetic field along a head running direction at a temperature of 298 K, and the in-plane coercivity Hc (173K) being measured while applying magnetic field along the head running direction at a temperature of 173 K.

5. A magnetic storage apparatus, comprising:

the perpendicular magnetic recording medium comprising:

a substrate;

a soft magnetic underlayer formed on said substrate and containing ferromagnetic α-Fe nanocrystals;

a nonmagnetic intermediate layer formed on said soft magnetic underlayer; and a perpendicular recording layer formed on said intermediate layer, wherein said soft magnetic underlayer contains Fe, Ta and C, and a concentration of said Ta ranges from 8at % to 15 at %, and a nonmagnetic amorphous or nanocrystalline pre-coating layer is provided between said substrate and said soft magnetic underlayer, said pre-coating layer comprising at least one selected from the group consisting of NiZr alloy, NiTa alloy, NiNb alloy, NiTaZr alloy, NiNbZr alloy, CoCrZr alloy, NiCrZr alloy;

a driving section for driving said perpendicular magnetic recording medium in a recording direction;

a magnetic head having a recording section and a reproduction section;

a unit for allowing said magnetic head to relatively move with respect to said perpendicular magnetic recording medium; and a recording/reproduction processing unit for receiving a signal of said magnetic head and reproducing an output signal from said magnetic head, wherein the reproduction section of said magnetic head is constituted by a high sensitivity element utilizing a magnetoresistance effect or a tunneling magnetoresistive effect.

6. The perpendicular magnetic recording medium according to claim 1, wherein a concentration of said C is 12 at % or more.

7. The perpendicular magnetic recording medium according to claim 1, wherein said soft magnetic underlayer is provided with ferromagnetic α-Fe nanocrystals by annealing.

8. The perpendicular magnetic recording medium according to claim 2, wherein said soft magnetic underlayer is provided with ferromagnetic α-Fe nanocrystals by annealing.

9. The magnetic storage apparatus according to claim 5, wherein said soft magnetic underlayer is provided with ferromagnetic α-Fe nanocrystals by annealing.

10. The perpendicular magnetic recording medium according to claim 1, wherein said soft magnetic underlayer is provided with ferromagnetic α-Fe nanocrystals by annealing at 450° C. or more while said pre-coating layer remaining amorphous or nanocrystalline.

11. The perpendicular magnetic recording medium according to claim 1, wherein said ferromagnetic α-Fe nanocrystals have particle diameters of approximately 10 nm.

12. The magnetic storage apparatus according to claim 5, wherein said soft magnetic underlayer is provided with ferromagnetic α-Fe nanocrystals by annealing at 450° C. or more while said pre-coating layer remaining amorphous or nanocrystalline.

13. The magnetic storage apparatus according to claim 5, wherein said ferromagnetic α-Fe nanocrystals have particle diameters of approximately 10 nm.

* * * * *